United States Patent [19]

Chi

[11] 4,423,451
[45] Dec. 27, 1983

[54] THIN FILM MAGNETIC HEAD HAVING DISPARATE POLES FOR PULSE ASYMMETRY COMPENSATION

[75] Inventor: Chao S. Chi, Shrewsbury, Mass.

[73] Assignee: Sperry Corporation, New York, N.Y.

[21] Appl. No.: 291,208

[22] Filed: Aug. 10, 1981

[51] Int. Cl.³ .......................... G11B 5/12; G11B 5/27; G11B 5/28; G11B 5/30

[52] U.S. Cl. ................................. 360/125; 360/113; 360/121

[58] Field of Search ............... 360/125, 123, 124, 113, 360/119, 113, 121; 338/32 R

[56] References Cited

U.S. PATENT DOCUMENTS

| | | | |
|---|---|---|---|
| 4,072,993 | 2/1978 | Nomura | 360/125 |
| 4,084,199 | 4/1978 | Dorreboom | 360/121 |
| 4,219,355 | 8/1980 | Jones | 360/125 |
| 4,268,882 | 5/1981 | Fukuda | 360/125 |
| 4,317,148 | 2/1982 | Chi | 360/125 |
| 4,354,212 | 10/1982 | Nouchi | 360/113 |

Primary Examiner—Robert M. Kilgore
Attorney, Agent, or Firm—Howard P. Terry

[57] ABSTRACT

A thin film magnetic read/write transducer has a substrate of magnetic material forming a pair of disparate pole pieces. Arranged adjacent a movable magnetic medium, the disparate pole pieces are constructed so that the leading pole piece has a greater distal surface area than the trailing pole piece. In an alternative arrangement the leading pole piece distal surface is disposed a greater distance from the medium than the trailing pole piece. In yet another arrangement the trailing pole piece distal surface is disposed at an acute angle to the medium, and the leading pole piece surface may be at a lesser angle or parallel to the medium. The disparate pole pieces, so constructed and arranged, introduce compensating non-linearities to the writing magnetic field to substantially counteract the non-linear properties of the medium and of the recording process.

8 Claims, 8 Drawing Figures

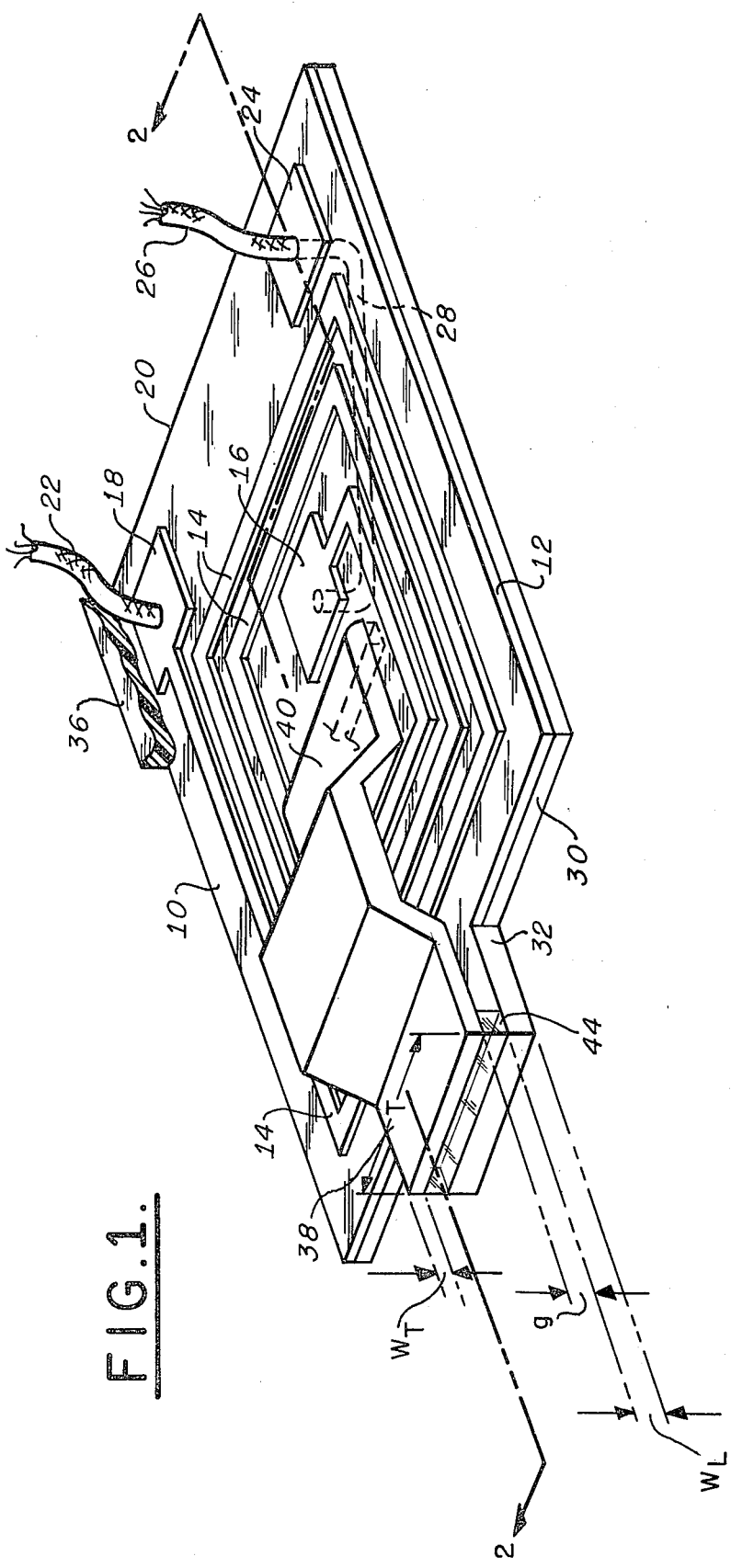

THIN FILM MAGNETIC HEAD HAVING DISPARATE POLES FOR PULSE ASYMMETRY COMPENSATION

BACKGROUND OF THE INVENTION

1. Field of the Invention

This invention relates to digital magnetic read/write transducers particularly with respect to thin film heads having disparate pole pieces to compensate for asymmetries inherent in a high density magnetic recording system.

2. Description of the Prior Art

Magnetic read/write transducers have undergone a rapid evolution in recent years in order to keep abreast of the computer industry's need for ever increasing bit storage densities. The application of photolithographic techniques, used for years to fabricate microelectronic components, has enabled the manufacture of thin film heads, which can be more accurately aligned than conventional ferrite heads, and have high permeability at frequencies up to 100 megahertz. In addition, the greatly reduced volume of magnetic material in these thin film heads results in lower subceptibility to electromagnetic noise, while the thinner pole tips allow finer resolution than can be achieved with conventional heads. However, even with today's thin film head, bit storage density is limited, as will be shown, by the nature of the recording medium, be it disk, tape, floppy disk, card, or drum.

Magnetic recording is a sequential process. A magnetic head is used to magnetize small areas or spots on the surface of a medium where the resulting magnetic flux at each spot points in one of two opposite directions according as a zero or as a one is being stored. The sensing of a stored bit of information is accomplished by means of a relative motion between the surface and the same or a similar head, such that changing flux lines pass through the head and induce a voltage, the polarity of which indicates whether a 0 or a 1 is being detected. The bit positions, or data cells, are normally arranged in tracks along the surface of the medium so that the bits in any one track pass sequentially in the vicinity of the writing or reading head. It is also common practice to record new information over the old information and to depend on the writing process for erasing the old information. Thus, to some extent the magnetic history of each data cell in the medium, and the demagnetizing field produced by apparent magnetic poles within the medium contribute to the total magnetic field surrounding the gap. As data cell space is made smaller and smaller, in pursuit of ever increasing bit storage density, the magnetic properties of the recording medium itself begin to have a substantial effect on the fringe field surrounding the head.

It is understood today that the main limitation on bit density is imposed by the writing-demagnetization process, and in particular by the recording medium interaction with the process. This interaction can be expressed in terms of two phenomena: linear distortion resulting from intersymbol interference and characterized by a non-constant read back amplitude and symmetrical pulse spreading; and non-linear distortion due to the inherent hysteresis properties of the magnetic media and demagnetizing fields associated with the magnetic history of the medium, characterized by asymmetrical, downstream, peak shifting and amplitude anomalies. It has been found that for bit densities beyond 3,000 flux changes per centimeter, non-linear distortion emerges as the dominant factor. While the linear distortion can be adequately minimized using electronic pulse shaping or linear spectral equalization networks, non-linear distortion has not heretofore been so easily controlled. Indeed, the non-linear nature of magnetic hysteresis properties defies simple compensation with electronic circuitry.

SUMMARY OF THE INVENTION

The present invention overcomes the problem of non-linear distortion in a very cost effective fashion during the writing-demagnetization process. The present transducer comprises a core or substrate of magnetic material, a thin film coil disposed on the core, and a pair of disparate pole pieces attached to the core and spaced apart from each other to define a gap therebetween. In use the pole pieces are disposed adjacent to a moving magnetic medium having inherent non-linear hysteresis properties. Current applied to the coil generates closed loop flux threading through the core, pole pieces, and gap, and creates a magnetic fringe field nearby the gap. The disparate pole pieces are so contructed and arranged as to introduce purposeful asymmetrical distributions in the fringe field which counteract the non-linear properties of the magnetic medium.

As will be appreciated from the disclosure to follow, the present invention is well suited to, and benefits from the thin film fabrication technologies available today.

BRIEF DESCRIPTION OF THE DRAWINGS

FIG. 1 is a perspective view showing the general configuration of the magnetic transducer according to the present invention;

FIG. 2 is a sectional view of the magnetic transducer taken along line 2—2 of FIG. 1;

DESCRIPTION OF THE PREFERRED EMBODIMENTS

Figure 3:
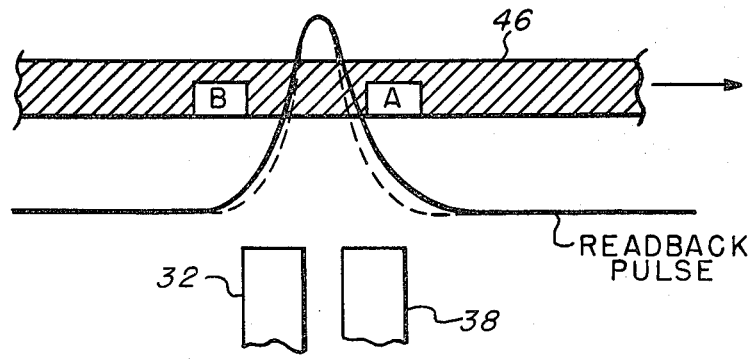
FIG. 3 shows the isolated readback characteristic pulse (or signal) of a prior art thin film head, useful in explaining the problems attendant to those heads.

FIG. 1 illustrates the general structure of a typical thin film head, which will be used to explain the more specific aspects of this invention. Of course there are other popular thin film head designs, all of which may profit from the invention, and thus the general structure described is not to be construed as a limitation. Futhermore, the invention will be described with respect to the longitudinal recording mode, in which the recording flux path is generally longitudinal and parallel to the direction of travel of the medium. However, it will be appreciated by those skilled in the art that the invention is equally applicable to the perpendicular recording mode, in which the recording flux path is generally perpendicular to the surface of the recording medium. Likewise, the invention is applicable to the vector recording mode, which represents the vector sum of the above two modes.

The head, as shown in FIG. 1, is of a laminated construction that can be achieved through precision mask, plating, and vacuum deposition using photolithographic techniques common to semiconductor fabrication. Commonly, several multiple layers of material must be deposited to build up the necessary thicknesses. Accordingly, a substrate 10 of high permeability material, such as Permalloy for instance, is built-up in successive layers until a sufficiently rigid thickness is reached. To reduce eddy current losses, the substrate may be laminated between layers of high resistivity material, especially if the substrate is composed of a material of relatively low resistivity. Upon one face of the substrate 10 is next deposited an insulation layer 12 followed by a metallized spiral coil as shown in FIG. 2 which is a cross-section of FIG. 1. The spiral coil 14 at its inner and outer end points has enlarged metallized terminal regions, hereinafter referred to as the inner terminal region 16 and the outer terminal region 18. The outer terminal region 18 is disposed along the back edge 20 of the substrate to facilitate an external electrical connection, as with an electrical connector or lead 22. Also disposed near the back edge 20 is another metallized area, designated as remote terminal region 24, for external electrical connection as with another electrical connector or lead 26. An electrically conductive path way 28 disposed on the underside of substrate 10 provides an electrical connection between the inner terminal region 16 and the remote terminal region 24. It is advantageous that spiral coil 14 have a sufficinet number of turns to effect a strong magnetic field when the terminal regions are energized. In this regard, the number of turns shown in FIGS. 1 and 2 is intended only to illustrate the general configuration and may not be indicative of the actual number of turns required for a particular application. It will also be understood that while a spiral coil has been illustrated and described, other coil configurations are possible such as a helical coil, for instance.

Opposite the back edge 20 is a front edge 30 which is tapered to a reduced dimension T corresponding to the track width. It will be understood that the selection of this track width T involves a compromise between track density and bit density, and depends greatly upon the desired application. Generally, a high track density implies a narrow track width, often with a degraded signal-to-noise ratio, which may require a lower bit density to reduce the possibility of error due to noise. The front edge 30 is provided with an outwardly projecting pole member designated as the leading pole 32 because of its relation, in use, to the magnetic recording medium, as will be more fully described below. The leading pole has a distal surface 34, preferably rectangular, having a length corresponding to dimension T and having a width $W_L$. The leading pole is comprised of the same or similar high permeability material as the substrate 10 and may be carefully and accurately layered to the desired thickness $W_L$. The spiral coil 14 is covered with a second insulation layer 36 upon which is deposited a region of high permeability material, forming a second magnetic pole member, hereinafter referred to as the trailing pole 38. The trailing pole 38 has a proximal portion 40 fabricated so as to pass through the insulating layers 12 and 36 and form a union with substrate 10 as shown in FIG. 2. The trailing pole 38 has a distal surface 42 of a length corresponding to the dimension T and a width $W_T$. Trailing pole 38 and leading pole 32 confront one another at their distal end portions to define a gap 44 of width g and length T. This gap may be air filled or it may be filled with non-magnetic material such as glass, adding rigidity to the pole members 32 and 38.

Again, it is emphasized that the foregoing structure is described simply to illustrate a typical thin film transducer configuration in which the present invention may be advantageously practiced, and it is not intended as limitation on the specific aspects of the invention to be described more fully below.

According to the present invention, physical disparties between the leading and trailing pole pieces are introduced to alter the fringe field around the gap 44 when the coil 14 is energized during use. This is done to compensate for non-linear distortion caused by the magnetic hysteresis and dynamic recording properties of the recording medium, which have heretofore plagued all prior art recording devices. To illustrate the non-linear distortion, FIG. 3 shows the characteristic readback signal (solid line) of a conventional thin film head in which the pole pieces, shown diagrammatically, are identical in width, shape, and distance from the magnetic medium. In FIG. 3, it is assumed that the magnetic medium 46 moves from left to right with respect to the stationary transducer, thus the left hand pole shall be designated as the leading pole 32 and the right hand pole shall be designated as the trailing pole 38. It will be noted that the signal is skewed from the symmetrical ideal shape shown in dashed lines. The asymmetry is largely the effect of magnetized microscopic particles in the recording medium which are in motion with respect to the fringe field generated by the recording head. The total fringe field is, of course, the sum of the fringe fields produced by the recording head and produced by the recorded data patterns in the magnetic medium. The nature of the total field is complicated by the fact that the magnetic medium exhibits hysteresis properties dependent in a non-linear fashion upon the magnetizing field produced by the head and upon the magnetic history of the particles within the medium. Because the medium is moving from left to right with respect to the head, the continually changing magnetized microscopic particles which are arranged into data cells contribute to the total fringe field in a non-linear way. In FIG. 3 a first data cell A and a second data cell B are represented diagrammatically. Motion is from left to right so data cell A has already passed the peak field region where data cell B has not yet encountered it. Data cell A may represent a bit of information stored only a moment before whereas data cell B may contain a bit of information soon to be erased and rewritten. It will be seen that as movement continues from left to right, data cell A moves into a region of relatively low head field and thus its own magnetic field becomes increasingly significant. On the other hand, data cell B moves into the increasingly intense head field region and becomes progressively less influential on the total field. The effect is to skew the field towards data cell A as shown. It is apparent that as bit densities increase, the non-linear distortion thus described will gradually emerge as a dominant factor.

According to the invention, a more nearly symmetrical readback signal can be obtained by introducing pole piece spatial disparities which can be accomplished in a number of different ways depending upon the fabrication techniques used. Three presently preferred embodiments are discussed herein, describing three configurations which produce the desired self-compensated fringe field, however, other embodiments may be envisioned without departing from the scope and the spirit of the invention.

Figure 4:
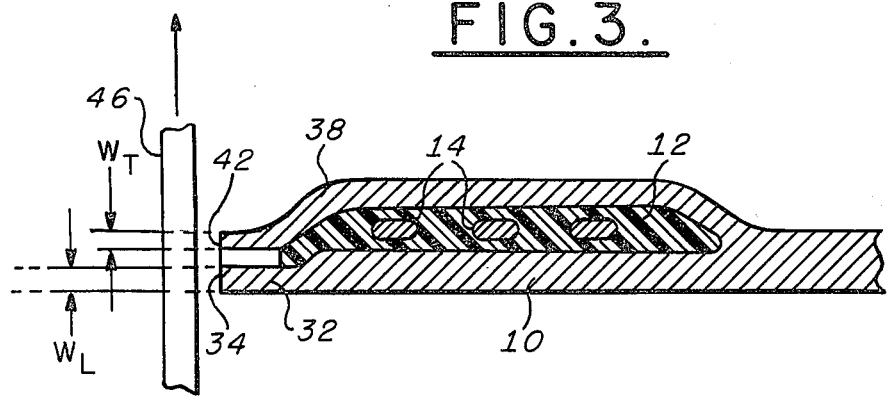
FIG. 4 is a partial sectional view, similar to FIG. 2, showing a first embodiment of the magnetic transducer of the invention.

In a first preferred embodiment shown in FIG. 4, the width $W_L$ of the leading pole is made larger than the width $W_T$ of the trailing pole. Selecting the proper ratio $W_T/W_L$ is, of course, dependent upon the non-linear properties of the recording medium. For the bulk storage disk medium popular today the ratio $W_L/W_T$ is on the order of 1.25:1, to give an example.

Figure 5:
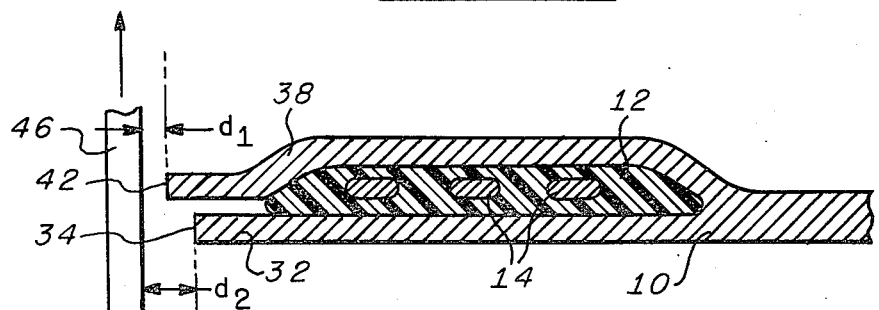
FIG. 5 is a similar view showing a second embodiment of the magnetic transducer.

In the second embodiment, shown in FIG. 5, the distal surface 34 of leading pole 32 is disposed a distance $d_2$ from the magnetic medium 46 and the distal surface 42 of trailing pole 38 is disposed a distance $d_1$ from the medium. Distance $d_2$ is greater than distance $d_1$ to effect a steeper trailing field. For ease of fabrication the leading pole 32 may be capped with a non-magnetic material, such as the material used between gap 44 to add rigidity. In this embodiment, the width $W_L$ and $W_T$ of the respective pole pieces may or may not be identical.

Figure 6:
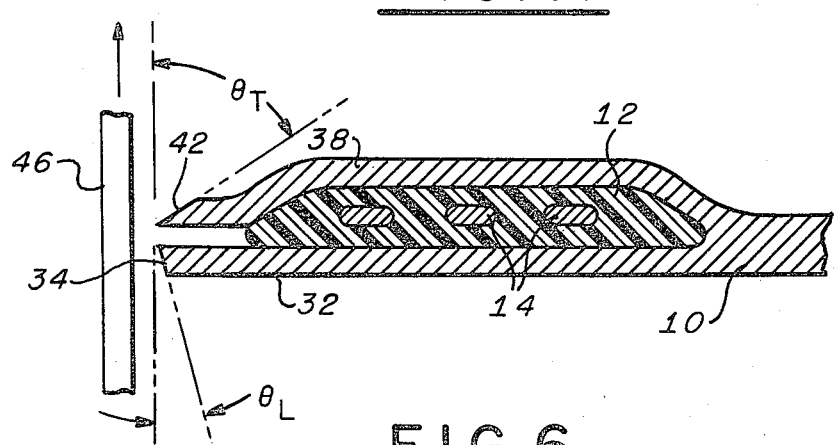
FIG. 6 is yet another view showing a third embodiment of the magnetic transducer.

In a third embodiment, shown in FIG. 6, the distal surface 34 of leading pole 32 is disposed at an angle $\theta_L$ with respect to the plane of the magnetic medium 46; or it may be disposed parallel to the plane of the magnetic medium (the special case where $\theta_L = 0$). The trailing distal surface 42 is disposed at an angle $\theta_T$ with respect to the plane of the magnetic medium 46. According to the invention angle $\theta_L$ is less than angle $\theta_T$ to effect a steeper trailing fringe field distribution.

Figure 7:
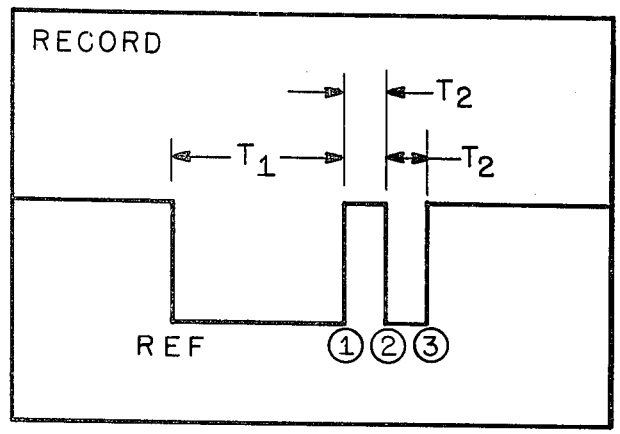
FIG. 7 shows a triplet bit transition sequence as might be applied to the magnetic transducer for recording data encoded therein.

In operation, regardless of which embodiment is chosen, a data encoded current is applied through leads 22 and 26 to energize coil 14, generating a magnetic field with closed path flux lines threading through pole 32, across gap 44, and through pole 38. By way of example, the energizing current may be data encoded by a bit transition sequence known as a triplet waveform. The triplet waveform is shown in FIG. 7 and is characterized by an initial reference transition REF followed at time $T_1$ by a first data transition ①, then followed after time $T_2$ be a second data transition ② and last followed after a similar time $T_2$ by a third data transition ③. These data transitions represent abrupt current transitions from high to low, or low to high states. The magnetic field, being proportional to these current changes applied to coil 14, produces in the magnetic medium a data sequence which, when read during playback, being a time derivative of magnetic transitions, appears as the pulsed output, shown in FIGS. 7a and 7b.

Figure 7A:
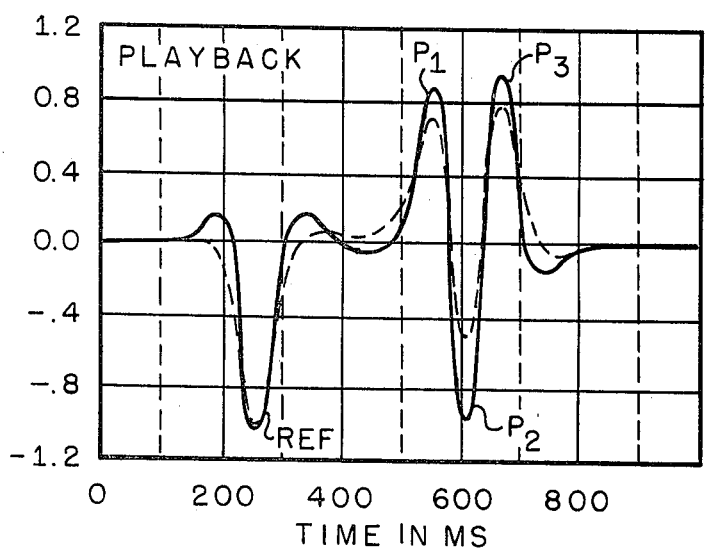
FIG. 7a shows this triplet sequence as it would appear during playback before (dashed line) and after (solid line) equalization by a prior art magnetic transducer.
Figure 7B:
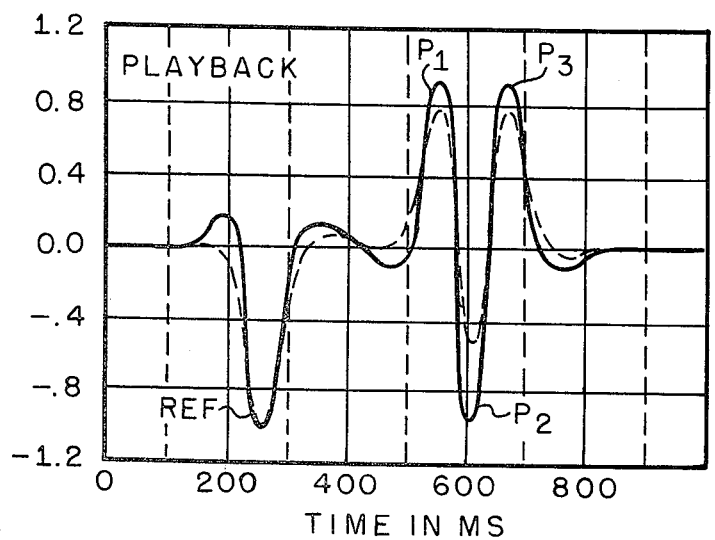
FIG. 7b is a similar playback triplet sequence before (dashed line) and after (solid line) equalization produced by the magnetic transducer of the invention.

FIG. 7a shows a characteristic triplet waveform produced by prior art devices, and FIG. 7b shows the triplet waveform produced by practicing the present invention. In both FIGS. 7a and 7b a reference pulse REF is followed by first, second and third impulses $P_1$, $P_2$ and $P_3$ respectively. It is important to note that in FIG. 7a peaks P1 and P3, either before (dashed) or after read equalization network (solid), differ in amplitude whereas in FIG. 7b they do not. This asymmetry increases as the bit density increases (or as $T_2$ decreases). Herein lies one benefit of the invention. It is common practice to detect the occurrence of these peaks by using a circuit which is responsive to signals above a certain threshold level, and it will be appreciated that this threshold must be set low enough to include low energy pulses such as $P_1$, and yet set as high as possible above the random noise energy. When an attempt is made to pack the bits as close together as possible, pulse amplitude decrease substantially, thereby reducing the margin between signal and noise. For this reason the equal amplitude triplet waveform of FIG. 7b has the decided advantage in that the detection threshold can be set optimumly to have the maximum noise margin.

In the case of the bulk storage disk medium popular today, storing data with a density of 13,200 flux changes per inch, at a flying height of 12 microinches, the present invention has demonstrated a reduction in pulse amplitude perturbation from a nominal 8.5% to a nominal 1.3%, and 84.7% improvement.

Another benefit realized by the present invention is improved timing or phase accuracy. In the ideal case the occurrence of impulses $P_1$, $P_2$, and $P_3$, for example, should exactly correspond to data transitions ①, ②, and ③ respectively. In other words, the timing between peaks should ideally be exactly the interval $T_2$. However, in practice this is not often the case. Timing perturbations on the order of 10-11% have been measured in the bulk storage disk system operated at 13,200 flux changes per inch at a 12$\mu$ in. flying height. Perturbations of this order of magnitude cannot be resolved in FIGS. 7a and 7b, however, it will be appreciated that timing error of this magnitude can be a significant problem at high bit storage densities. With the present invention, timing accuracy has been improved an average of 9.8% over the prior art.

These improvements represent a substantial reduction in the amount of non-linear distortion, not previously achieved through linear spectral equalization techniques. Thus it will be seen that the present invention represents a significant improvement in the performance of thin film magnetic recording transducers by self-compensating for non-linear effects heretofore considered uncontrollable.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A thin film transducer for magnetically recording on a recording medium, comprising a substrate of soft magnetic material, said substrate further comprising first and second thin-film non-saturated pole members, spaced apart from each other to define a gap therebetween and coupled to inductive coil means for magnetically coupling a signal to said pole members, each pole member having a surface, in use, disposed adjacent said recording medium, said pole surfaces having a spatial disparity with respect to each other and with respect to said recording medium, so constructed and arranged to substantially compensate for nonlinear recording properties of said medium.

2. A transducer according to claim 1 wherein said pole members have substantially equal lengths in the plane of the gap transverse to the direction of travel of the medium, and said surface of said first pole member has greater area than said surface of said second pole member, whereby said spatial disparity is defined.

3. A transducer according to claim 1 wherein said surface of said first pole member is disposed a distance from said medium greater than said surface of said second pole member is disposed, whereby said spatial disparity is defined.

4. A transducer according to claim 1 wherein said surface of said first pole member defines a first angle with the plane of said adjacent medium and said surface of said second pole member defines a second angle with the plane of said adjacent medium, wherein said first angle is less than said second angle.

5. A transducer according to claim 1 wherein said surface of said second pole member defines an acute angle with the plane of said adjacent medium.

6. A transducer according to claims 2, 3, 4 or 5 wherein said pole members are fixed relative to a movable recording medium and so arranged that a point on said movable medium passes said first pole member before passing said second pole member.

7. A transducer according to claim 2, wherein said spatial disparity is defined by a predetermined ratio.

8. A transducer according to claim 7, wherein said ratio is about 1.25:1.

* * * * *